(12) United States Patent
Buendiger

(10) Patent No.: US 6,343,569 B1
(45) Date of Patent: Feb. 5, 2002

(54) WALL MOUNTED CAT SCRATCHING POST

(76) Inventor: Paul H. Buendiger, Rte. #1, Box #130-B, Richville, MN (US) 56576

( * ) Notice: Subject to any disclaimer, the term of this patent is extended or adjusted under 35 U.S.C. 154(b) by 0 days.

(21) Appl. No.: 09/822,393

(22) Filed: Mar. 30, 2001

(51) Int. Cl.[7] ............................................. A01K 15/02
(52) U.S. Cl. .................................................... 119/706
(58) Field of Search .............................. 119/706, 28.5; 150/158; 312/229; 248/345.1; D8/402, 403; D6/491; D30/158, 160; 24/292, 293, 294

(56) References Cited

U.S. PATENT DOCUMENTS

| | | |
|---|---|---|
| 4,907,540 A | 3/1990 | Reynolds |
| 4,926,796 A | 5/1990 | Leopold |
| 5,168,831 A * | 12/1992 | Ittershagen et al. ........... 119/29 |
| D336,033 S | 6/1993 | Welsh |
| 5,592,901 A | 1/1997 | Birminham |
| 5,619,953 A | 4/1997 | Griffin |
| 5,775,263 A | 7/1998 | Richards |
| 6,089,188 A * | 7/2000 | Corley ...................... 119/161 |

* cited by examiner

*Primary Examiner*—Peter M. Poon
*Assistant Examiner*—Kevin Jakel

(57) ABSTRACT

A wall mounted cat scratching post for providing a space efficient scratching post. The wall mounted cat scratching post includes three sides, each adapted for coupling to an exposed end of a wall section of a building, and having an exterior surface substantially covered by a textile material for facilitating the scratching function for the cat using the wall mounted cat scratching post; and a base member adapted for resting upon a horizontal supporting surface such as a floor, coupled to the vertical member, and used to inhibit the vertical member from moving away from the wall end section.

11 Claims, 2 Drawing Sheets

WALL MOUNTED CAT SCRATCHING POST

BACKGROUND OF THE INVENTION

1. Field of the Invention

The present invention relates to scratching posts and more particularly pertains to a new wall mounted cat scratching post for providing a space efficient scratching post.

2. Description of the Prior Art

The use of scratching posts is known in the prior art. More specifically, scratching posts heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,592,901; U.S. Pat. No. 5,619,953; U.S. Pat. No. Des. 336,033; U.S. Pat. No. 4,907,540; U.S. Pat. No. 4,926,796; and U.S. Pat. No. 5,775,263.

While these devices fulfill their respective, particular objectives and requirements, the aforementioned patents do not disclose a new wall mounted cat scratching post. The inventive device includes a vertical member which includes three sides, each adapted for coupling to an exposed end of a wall section of a building, and having an exterior surface substantially covered by a textile material for facilitating the scratching function for the cat using the wall mounted cat scratching post; and a base member adapted for resting upon a horizontal supporting surface such as a floor, coupled to the vertical member, and used to inhibit the vertical member from moving away from the wall end section.

In these respects, the wall mounted cat scratching post according to the present invention substantially departs from the conventional concepts and designs of the prior art, and in so doing provides an apparatus primarily developed for the purpose of providing a space efficient scratching post.

SUMMARY OF THE INVENTION

In view of the foregoing disadvantages inherent in the known types of scratching posts now present in the prior art, the present invention provides a new wall mounted cat scratching post construction wherein the same can be utilized for providing a space efficient scratching post.

The general purpose of the present invention, which will be described subsequently in greater detail, is to provide a new wall mounted cat scratching post apparatus and method which has many of the advantages of the scratching posts mentioned heretofore and many novel features that result in a new wall mounted cat scratching post which is not anticipated, rendered obvious, suggested, or even implied by any of the prior art scratching posts, either alone or in any combination thereof.

To attain this, the present invention generally comprises three sides, each adapted for coupling to an exposed end of a wall section of a building, and having an exterior surface substantially covered by a textile material for facilitating the scratching function for the cat using the wall mounted cat scratching post; and a base member adapted for resting upon a horizontal supporting surface such as a floor, coupled to the vertical member, and used to inhibit the vertical member from moving away from the wall end section.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wall mounted cat scratching post apparatus and method which has many of the advantages of the scratching posts mentioned heretofore and many novel features that result in a new wall mounted cat scratching post which is not anticipated, rendered obvious, suggested, or even implied by any of the prior art scratching posts, either alone or in any combination thereof.

It is another object of the present invention to provide a new wall mounted cat scratching post which may be easily and efficiently manufactured and marketed.

It is a further object of the present invention to provide a new wall mounted cat scratching post which is of a durable and reliable construction.

An even further object of the present invention is to provide a new wall mounted cat scratching post which is susceptible of a low cost of manufacture with regard to both materials and labor, and which accordingly is then susceptible of low prices of sale to the consuming public, thereby making such wall mounted cat scratching post economically available to the buying public.

Still yet another object of the present invention is to provide a new wall mounted cat scratching post which provides in the apparatuses and methods of the prior art some of the advantages thereof, while simultaneously overcoming some of the disadvantages normally associated therewith.

Still another object of the present invention is to provide a new wall mounted cat scratching post for providing a space efficient scratching post.

Yet another object of the present invention is to provide a new wall mounted cat scratching post which includes three sides, each adapted for coupling to an exposed end of a wall section of a building, and having an exterior surface substantially covered by a textile material for facilitating the scratching function for the cat using the wall mounted cat scratching post; and a base member adapted for resting upon a horizontal supporting surface such as a floor, coupled to the vertical member, and used to inhibit the vertical member from moving away from the wall end section.

Still yet another object of the present invention is to provide a new wall mounted cat scratching post that is highly space efficient.

Even still another object of the present invention is to provide a new wall mounted cat scratching post that protects exposed wall end sections and the surrounding carpeting from scratching by a pet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
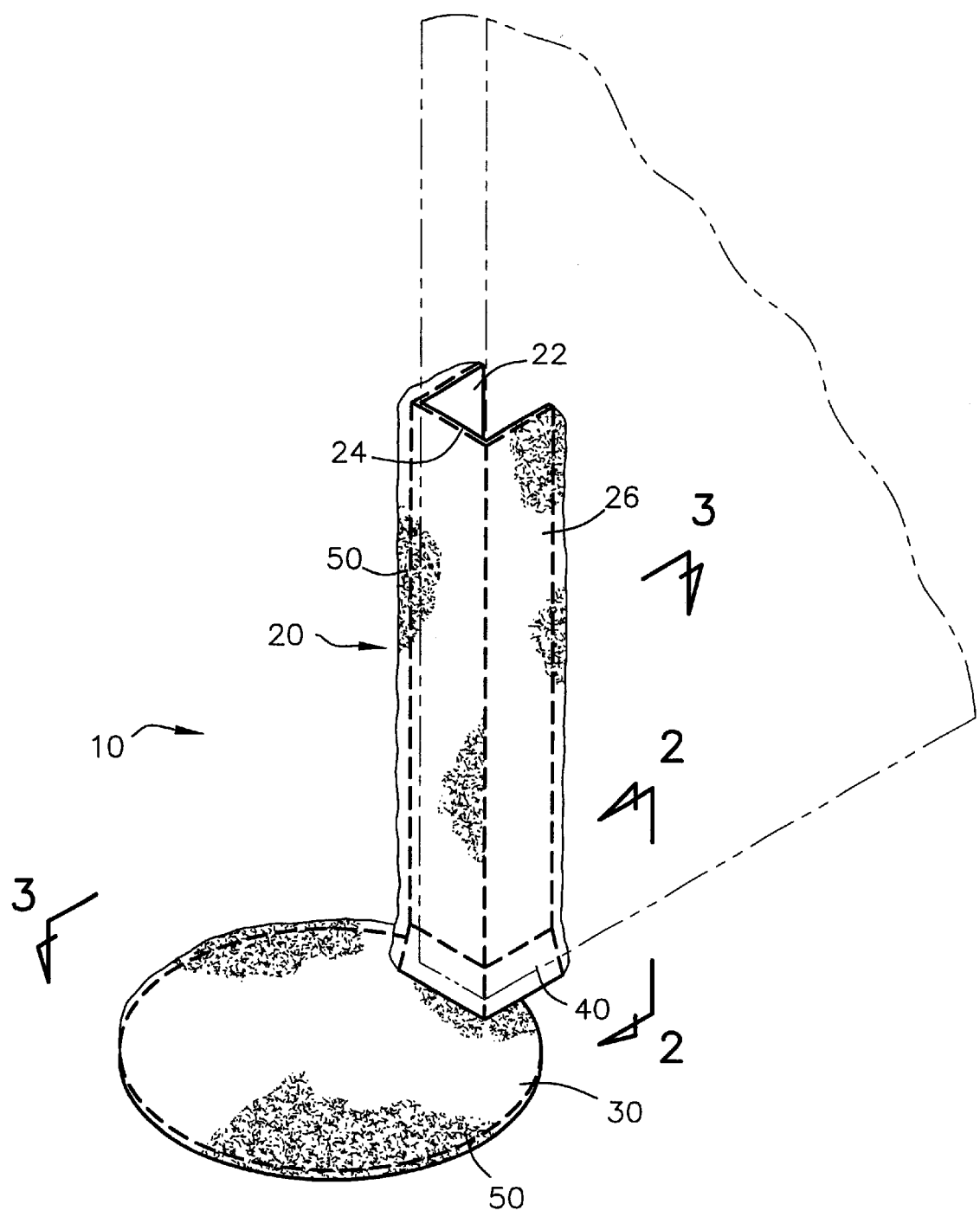
FIG. 1 is a schematic perspective view of a new wall mounted cat scratching post according to the present invention.
Figure 3:
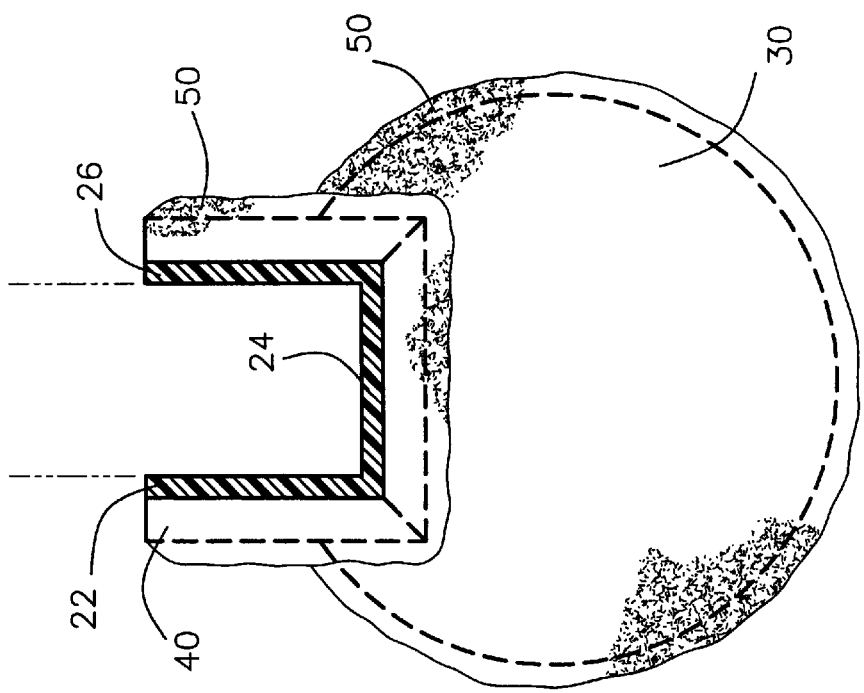
FIG. 3 is a schematic cross-sectional view of the present invention taken along line 3—3 of FIG. 1.
Figure 2:
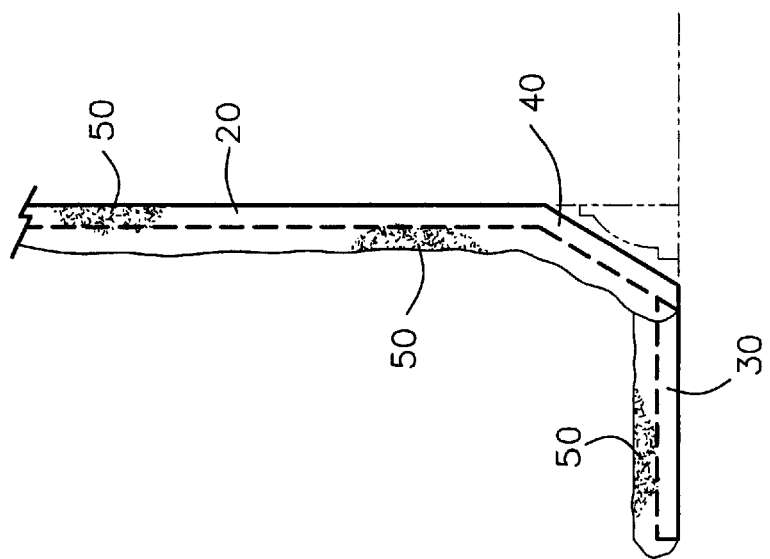
FIG. 2 is a schematic cross-sectional view of the present invention taken along line 2—2 of FIG. 1.

With reference now to the drawings, and in particular to FIGS. 1 through 3 thereof, a new wall mounted cat scratching post embodying the principles and concepts of the present invention and generally designated by the reference numeral 10 will be described.

As best illustrated in FIGS. 1 through 3, the wall mounted cat scratching post 10 generally comprises a vertical member 20, a biased member 40, and a base member 30.

The vertical member 20 includes three sides designed for coupling to an exposed end of a wall section of a building. The vertical member 20 includes an exterior surface substantially covered by a textile material 50. The textile material 50 is used to facilitate the scratching function for the cat using the wall mounted cat scratching post 10.

The base member 30 is designed for resting upon a horizontal supporting surface such as a floor. The base member 30 is coupled to the vertical member 20. The base member 30 inhibits the vertical member 20 from moving away from the wall end section.

The biased member 40 forms a transition between the vertical member 20 and the horizontal member 30. The biased member 40 provides a clearance area for a baseboard trim attached to the wall end section. The biased member 40 extends outwardly from the vertical member 20 such that as the biased member 40 approaches the base member 30, a surface of the biased member 40 runs substantially away from the wall end section.

In an embodiment the biased member 40 includes an exterior surface. The exterior surface is substantially covered by a textile material 50, which facilitates the scratching function for the cat using the wall mounted cat scratching post 10.

In a further embodiment the base member 30 is also covered with a textile material 50 to facilitate the scratching function for the cat using the wall mounted scratching post 10.

In still a further embodiment the vertical member 20 includes a height of substantially three feet.

The vertical member 20 comprises three sides, which are a first wall 22, a second wall 24, and a third wall 26. The first one 22 of the three walls is designed for positioning adjacent to a first surface of the wall end section.

The second one 24 of the three walls is designed for positioning adjacent to a second surface of the wall end section. The second one 24 of the three walls includes a surface, which defines a second plane. The first one 22 of the three walls includes a surface defines a first plane. The second wall 24 is positioned such that the second plane is substantially perpendicular to the first plane defined by the surface of the first wall 22.

The third one 26 of the three walls is designed for positioning adjacent to a third surface of the wall end section. Similarly, the third wall 26 also includes a surface, which defines a third plane. The third wall 26 is positioned such that the third plane is substantially parallel to the first plane and the third plane is substantially perpendicular to the second plane.

In an embodiment the first 22 and third walls 26 each includes a width of approximately six inches.

In further embodiment the second wall 24 includes a width of approximately four and three-quarters inches.

In still a further embodiment the textile material 50 covering the surfaces of the vertical member 20, the biased member 40, and the base member 30 is carpeting.

In still yet a further embodiment the base member 30 is substantially circular.

In use, the wall mounted cat scratching post is positioned around an exposed end section of a wall. A cat may then use the wall mounted cat scratching post in the conventional manner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wall mounted cat scratching post comprising:

a vertical member having three sides adapted for coupling to an exposed end of a wall section of a building, said vertical member having an exterior surface substantially covered by a textile material, said textile material facilitating the scratching function for the cat using said wall mounted cat scratching post;

a base member adapted for resting upon a horizontal supporting surface such as a floor, said base member being coupled to said vertical member, said base member inhibiting said vertical member from moving away from the wall end section.

2. The wall mounted cat scratching post of claim 1, further comprising:

a biased member forming a transition between said vertical member and said horizontal member, said biased member providing a clearance area for a baseboard trim attached to the wall end section, said biased member extending outwardly from said vertical member such that as the biased member approaches the base member a surface of said biased member runs substantially away from the wall end section.

3. The wall mounted cat scratching post of claim 2, further comprising:

wherein said biased member having an exterior surface, said exterior surface being substantially covered by a textile material for facilitating the scratching function for the cat using said wall mounted cat scratching post.

4. The wall mounted cat scratching post of claim 1, further comprising:

wherein said base member being covered with a textile material to facilitate the scratching function for the cat using the wall mounted scratching post.

5. The cat scratching post of claim 1 wherein said vertical member having a height of substantially three feet.

6. The cat scratching post of claim 1, wherein said vertical member further comprises:

a first one of said three walls being adapted for positioning adjacent to a first surface of the wall end section;

a second one of said three wall being adapted for positioning adjacent to a second surface of the wall end section, said second one of said three walls having a surface defining a second plane, said first one of said three walls having a surface defining a first plane, said second wall being positioned such that said second plane is substantially perpendicular to said first plane defined by said surface of said first wall;

a third one of said three walls being adapted for positioning adjacent to a third surface of said wall end section, said third wall having a surface defining a third plane, said third wall being positioned such that said third plane is substantially parallel to said first plane and said third plane is substantially perpendicular to said second plane.

7. The wall mounted cat scratching post of claim 6, wherein said first and third walls each having a width of approximately six inches.

8. The wall mounted cat scratching post of claim 6, wherein said second wall having a width of approximately four and three-quarters inches.

9. A wall mounted cat scratching post comprising:

a vertical member having three sides adapted for coupling to an exposed end of a wall section of a building, said vertical member having an exterior surface substantially covered by a textile material, said textile material facilitating the scratching function for the cat using said wall mounted cat scratching post;

a base member adapted for resting upon a horizontal supporting surface such as a floor, said base member being coupled to said vertical member, said base member inhibiting said vertical member from moving away from the wall end section;

a biased member forming a transition between said vertical member and said horizontal member, said biased member providing a clearance area for a baseboard trim attached to the wall end section, said biased member extending outwardly from said vertical member such that as the biased member approaches the base member a surface of said biased member runs substantially away from the wall end section;

wherein said biased member having an exterior surface, said exterior surface being substantially covered by a textile material for facilitating the scratching function for the cat using said wall mounted cat scratching post;

wherein said base member being covered with a textile material to facilitate the scratching function for the cat using the wall mounted scratching post; wherein said vertical member having a height of substantially three feet;

wherein said vertical member further comprises:

a first one of said three walls being adapted for positioning adjacent to a first surface of the wall end section;

a second one of said three wall being adapted for positioning adjacent to a second surface of the wall end section, said second one of said three walls having a surface defining a second plane, said first one of said three walls having a surface defining a first plane, said second wall being positioned such that said second plane is substantially perpendicular to said first plane defined by said surface of said first wall;

a third one of said three walls being adapted for positioning adjacent to a third surface of said wall end section, said third wall having a surface defining a third plane, said third wall being positioned such that said third plane is substantially parallel to said first plane and said third plane is substantially perpendicular to said second plane;

wherein said first and third walls each having a width of approximately six inches;

wherein said second wall having a width of approximately four and three-quarters inches.

10. The wall mounted cat scratching post of claim 9, wherein said textile material comprises carpeting.

11. The wall mounted cat scratching post of claim 10, wherein said base member being substantially circular.

* * * * *